Patented June 12, 1923.

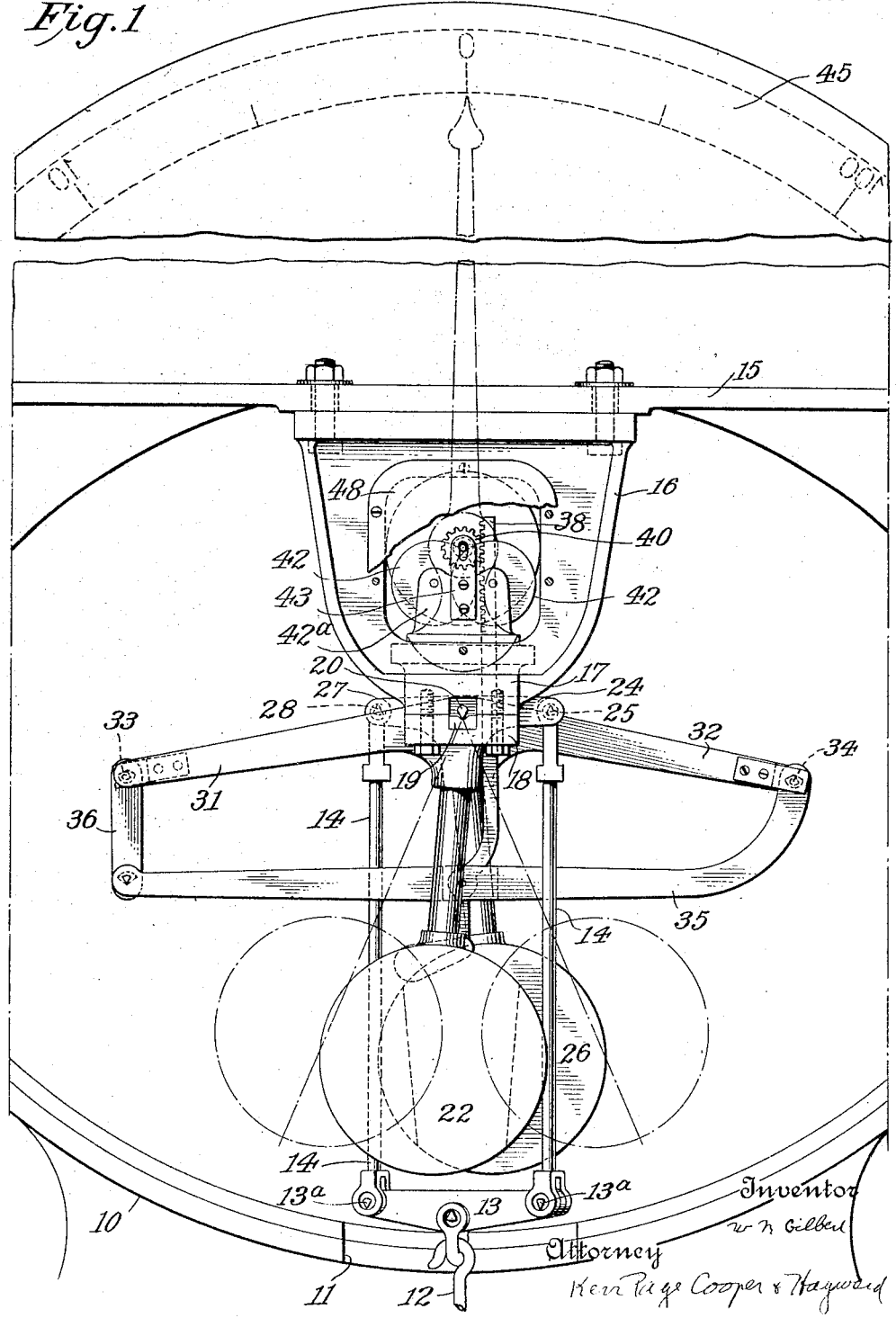

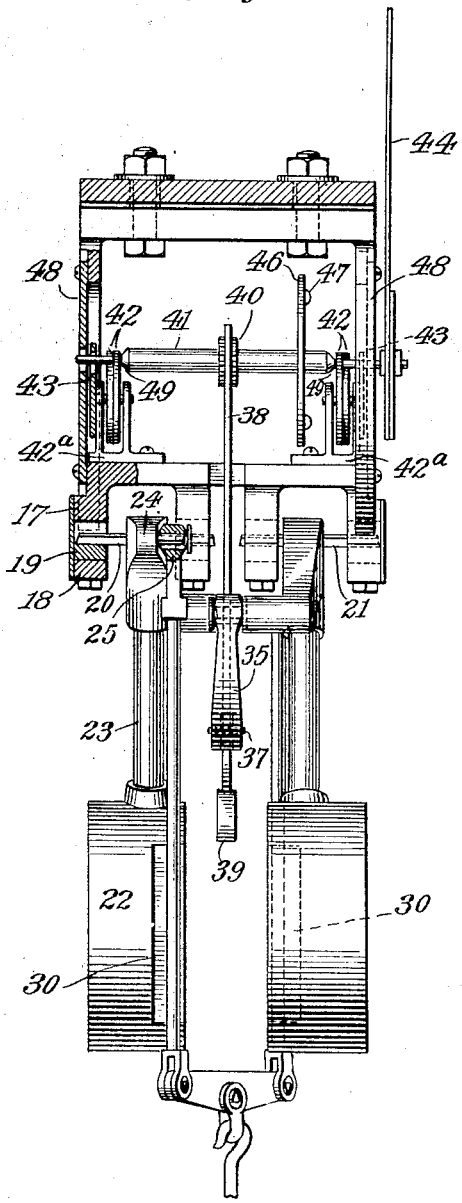

1,458,480

UNITED STATES PATENT OFFICE.

WILLIAM NATHAN GILBERT, OF DAYTON, OHIO, ASSIGNOR TO INTERNATIONAL SCALE COMPANY, OF DAYTON, OHIO, A CORPORATION OF ILLINOIS.

PENDULUM SCALE.

Application filed April 11, 1921. Serial No. 460,186.

*To all whom it may concern:*

Be it known that I, WILLIAM NATHAN GILBERT, a citizen of the United States of America, residing at Dayton, in the county of Montgomery and State of Ohio, have invented certain new and useful Improvements in Pendulum Scales, of which the following is a full, clear, and exact description.

This invention relates to improvements in pendulum weighing scales and more particularly to the improvements in the arrangement of the pendulum counterbalance and the connections therefrom to the load support and to the weight indicator.

The particular advantages and objects of the present invention will be pointed out in further detail in the accompanying specification and drawings which describe and show a preferred embodiment thereof.

In the drawings:

Fig. 1 shows a rear elevation of the principal parts of scale. Certain parts of the housing and dial are shown broken away in order to show the main parts upon a more magnified scale.

Fig. 2 shows a side view of the main scale parts with dial and casing removed.

In more detail the scale comprises a casing 10 having an opening 11 therein through which the draft rod 12 extends to any suitable load support or base lever system (not shown). The draft rod through a suitable loop and pivot connects with a diagonally disposed equalizer bar 12. At each end of the equalizer bar there are provided knife-edge pivots 13ª, which cooperate with bearings in the lower end of a pair of links 14, which, at their upper ends, connect with the pendulums as will be hereinafter described.

Extending across the housing is a frame portion 15 from which a double bracket 16 depends. The bracket 16 has a plurality of pairs of depending bosses 17 to which are bolted bearing caps 18. These bearing caps retain in position agate or like bearings 19, which have their bearing points in alignment. Resting in the pairs of bearings are knife edges 20 and 21. Knife edge 20 is mounted in the hub of a pendulum 22 having a stem 23 and an arm 24 which extends outwardly and carries a knife edge 25, which connects with one of the links 14. The other knife edge 21 is secured in the hub of the other pendulum which has an arm 27 which extends outwardly in an opposite direction from arm 24 and carries a knife edge 28 connecting the arm with the other link 14. Pendulum 26 is provided with the usual stem 29.

In order to permit the pendulums to swing closely to a vertical depending position, the pendulum balls are suitably notched as shown at 30. This permits the balls to clear the links 14 and permits a particularly compact arrangement of pendulums.

Arm 24 of pendulum 22 is extended past the pivot, as shown in Fig. 1, at 31, and arm 27 is similarly and oppositely extended, as shown at 32. The arms 31 and 32 carry knife edge pivots 33 and 34. The latter pivot supports a curved cross bar 35 which extends across the device between the pendulum stems and at its end is provided with a suitable pivot. The knife edge 33 supports a link 36, which, at its lower end, carries a V-bearing cooperating with the pivot on cross bar 35.

It will be understood that upon the application of a load to the draft rod the gravity pull of the load will cause the pendulums to swing outwardly toward the dotted line position. The various arms of the pendulum system will swing so as to elevate the cross bar 35 and this movement or displacement of the cross bar will correspond to the applied load.

The raising and lowering movement of this cross bar is used to variably displace an indicator. The middle portion of the cross bar 35 is preferably bifurcated and provided with a pin 37 which connects an indicator rack 38 with bar 35. The rack rod is extended beyond pivot 37 and is provided with an enmeshing weight 39, which serves to keep the rack lightly enmeshed with a pinion 40. Pinion 40 is fixed upon an arbor 41 which is rotatably supported upon interacting disk bearings 42. There are two pairs of these disk bearings, and the disks of each pair are rotatably mounted in brackets 42ª carried by bracket 16. Suitable slotted plates 43 are carried by bracket 42ª to loosely receive the arbor 40 and limit excessive vertical movement thereof. The arbor 41 at one of its ends carries a pivotal indicator 44 which is adapted to sweep over a dial 45, carried by the housing, and indicate the applied load. A sealing disk 46 provided with adjustable weights 47 is also carried by the arbor shaft. Suitable cover plates 48 may be provided to cover the pinion and bearings. Endwise movement of the arbor is prevented by tapered shoulders 49.

The arrangement of counterbalancing pendulums is such that the scales with which they are equipped are adapted to be operated upon floor surfaces which are not exactly level. The pendulum pivots being aligned and having their knife edges 25 and 28 disposed directly over the knife edges 13ᵃ, carried by the evener bar 13, permit these irregularities of level to occur without affecting the counterbalancing of the scale.

The pendulums swing in unison in parallel planes and this arrangement permits the arms 24—31 and 27—32 to extend in opposite directions from the pivot points of the pendulums and each set of arms swings in its own plane. This obviates a complicated configuration of the arms and permits a simple connection to the equalizer. The construction is also such that the entire assembly may be exceeding compact. The arms 31 and 32 may be made of any desired length depending upon the multiplication which is desired between the pendulum system and the indicator.

Hereafter in the claims I will refer to pivotally aligned pendulums or aligned bearings. By this it is meant that the pivot edges of each pivot and the bearing line of each bearing are disposed in one and the same line with the pivot lines or bearing point lines of the other pendulum pivots or bearings.

What I claim is:

1. In a weighing scale in combination, a pair of pendulums mounted in pivotal alignment with each other, an equalizer bar having links connecting the same to said pendulums, an indicator driving device comprising a member coupled to both of said pendulums and elevated and lowered thereby, and a rack connected to said member for driving a pivotal indicator.

2. In a weighing scale having in combination, a pair of pivotally aligned pendulums, a pair of arms carried by each pendulum and extending in opposite directions from the pivotal mounting thereof, a pair of links depending from one pair of the said arms and an equalizer bar connecting the said links, a member connected to the other of the said pendulum arms and raised and lowered during their movement, a pivotal indicator and driving connections from the aforesaid member to said indicator.

3. In a weighing scale in combination with pairs of aligned bearings, of a pair of knife edges supported thereby and pendulums carried by each of said knife edges, arms carried by the said pendulums and extending in opposite directions from the pivotal point thereof, links depending from each of said arms, an equalizer bar disposed diagonally to the planes of the said arms and connected to the said links, and a draft rod connected to the said equalizer.

4. In a weighing scale in combination, a pair of pivotally aligned pendulums, arms carried by each pendulum extending in opposite directions outwardly from the pivots and disposed in different planes, of a link depending from each arm, a diagonally disposed evener bar connecting the said links and a draft rod connected to the said links.

5. In a weighing scale, in combination with a pair of pivotally aligned pendulums, a plurality of arms extending in opposite directions from the pivot of each pendulum, links depending from one pair of the said oppositely extending arms, an evener bar connected to the ends of said links, a draft rod connected thereto, a member connected to another pair of the said arms, a pivotal indicator having a pinion and a rack for driving the same connected to the aforesaid member.

6. In a weighing scale, in combination with a pair of pendulums, of pivots for each of said pendulums, the pivot line of the pivot of one pendulum being in alignment with the pivot line of the other pendulum pivot, of oppositely extending arms connected to each of said pendulums, of a load support connected to one pair of said arms, and an indicator driving means connected to the other pair of said arms.

7. In a weighing scale in combination, a pair of pendulums pivotally mounted in alignment and swinging in unison in opposite directions in parallel spaced planes, a load support connected to said pendulums, a pair of arms connected each to one pendulum and extending in opposite directions from the pivotal point thereof, a cross member disposed between the pendulums and connected at its ends to the said arms, a rack connected to said member, and a pivotal indicator having a pinion enmeshing with said rack.

8. In a weighing scale in combination, a housing frame, a bracket carried thereby, a plurality of aligned bearings carried by said bracket, a pair of disk bearings carried by said bracket, an arbor supported upon said bearings carrying a pivotal indicator and a pinion, a pair of pendulums pivotally supported in alignment in the first mentioned bearings, an arm upon each pendulum connected to a load support, a cross member, a second arm on each pendulum, connected to said cross member and a rack connected to said cross member and meshing with the aforesaid pinion.

9. A weighing scale having a pendulum counterbalancing system comprising, in combination, a pair of pivotally mounted pendulums, said pendulum pivots having their bearing points disposed in the same line, a pair of arms carried by each pendulum and extending in opposite directions from the pivots thereof, depending links carried by one pair of said oppositely extending arms, a cross member carried by the other pair of arms, an indicator having a driving connection to said cross member, an equalizer connected to said links, and a draft rod connected to said equalizer.

10. A weighing scale comprising a pair of pendulums, each pendulum having an arm connected to a load support, a pair of oppositely extending arms carried by the said pendulum, a cross member connected directly to one of the said arms and a link connecting said cross member to the other of said arms, and an indicator driving means connected to the said cross member.

In testimony whereof I hereto affix my signature.

WILLIAM NATHAN GILBERT.